United States Patent
von der Weid et al.

(10) Patent No.: US 10,218,434 B2
(45) Date of Patent: Feb. 26, 2019

(54) MONITORING OPTICAL FIBRE LINK

(71) Applicant: Telefonaktiebolaget LM Ericsson (publ), Stockholm (SE)

(72) Inventors: Jean Pierre von der Weid, Rio de Janeiro (BR); Gustavo Castro do Amaral, Rio de Janeiro (BR); Renata Goldman Leibel, Rio de Janeiro (BR); Diego Rodrigo Villafani Caballero, Rio de Janeiro (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/534,117

(22) PCT Filed: Jan. 21, 2015

(86) PCT No.: PCT/SE2015/050051
§ 371 (c)(1),
(2) Date: Jun. 8, 2017

(87) PCT Pub. No.: WO2016/118053
PCT Pub. Date: Jul. 28, 2016

(65) Prior Publication Data
US 2017/0346550 A1  Nov. 30, 2017

(51) Int. Cl.
*H04B 10/08* (2006.01)
*H04B 10/071* (2013.01)
*H04B 10/077* (2013.01)
*H04B 10/079* (2013.01)

(52) U.S. Cl.
CPC ....... *H04B 10/071* (2013.01); *H04B 10/0771* (2013.01); *H04B 10/0777* (2013.01); *H04B 10/0791* (2013.01); *H04B 10/0797* (2013.01)

(58) Field of Classification Search
CPC ............. H04B 10/071; H04B 10/0771; H04B 10/0777; H04B 10/0791; H04B 10/0797
(Continued)

(56) References Cited

U.S. PATENT DOCUMENTS

| | | | |
|---|---|---|---|
| 8,050,554 B2 | 11/2011 | Jang et al. | |
| 2004/0047629 A1* | 3/2004 | Evangelides, Jr. .. | H04B 10/071 398/33 |
| 2005/0196174 A1 | 9/2005 | Evangelides, Jr. et al. | |

FOREIGN PATENT DOCUMENTS

| | | | |
|---|---|---|---|
| EP | 1884758 A1 | 2/2008 | |
| WO | 2013141765 A1 | 9/2013 | |
| WO | WO 2013/141765 A1 * | 9/2013 | ............ G01M 11/00 |

OTHER PUBLICATIONS

Nakao, Naoki et al., "Maintenance Method Using 1650-nm Wavelength Band for Optical Fiber Cable Networks," Journal of Lightwave Technology, vol. 19, Issue 10, Oct. 2001, IEEE, pp. 1513-1520.

(Continued)

*Primary Examiner* — M. R. Sedighian
(74) *Attorney, Agent, or Firm* — Withrow & Terranova, PLLC

(57) ABSTRACT

The invention relates to a device and a method performed by the device of monitoring an optical fibre link. The method provided for monitoring an optical fibre link comprises generating a monitoring signal used for monitoring the optical fibre link, combining the generated monitoring signal with a data signal to be transmitted over the optical fibre link, detecting backscattering of the monitoring signal from the optical fibre link, comparing the detected backscattered monitoring signal with an estimated monitoring signal backscattered along the optical fibre link, and determining, based on the comparison, at least one location along the optical (Continued)

fibre link where the monitoring signal is backscattered, and signal loss caused by the backscattering.

11 Claims, 9 Drawing Sheets

(58) Field of Classification Search
USPC .......................................................... 398/21
See application file for complete search history.

(56) References Cited

OTHER PUBLICATIONS

Sankawa, Izumi et al., "Fault Location Technique for In-Service Branched Optical Fiber Networks," IEEE Photonics Technology Letters, vol. 2, Issue 10, Oct. 1990, IEEE, pp. 766-768.

Takeda, Kazutoki et al., "Fault Location in Optical Lines of Passive Double Star Networks by Pattern Matching of OTDR Waveforms," Electronics and Communications in Japan, Part 1, vol. 77, Issue 7, 1994, Scripta Technica, Inc, pp. 1-13.

Tanaka, Kuniaki et al., "Measuring the Individual Attenuation Distribution of Passive Branched Optical Networks," IEEE Photonics Technology Letters, vol. 8, Issue 7, Jul. 1996, IEEE, pp. 915-917.

Wegmuller, M. et al., "Distributed Beatlength Measurement in Single-Mode Fibers With Optical Frequency-Domain Reflectometry," Journal of Lightwave Technology, vol. 20, Issue 5, May 2002, IEEE, pp. 828-835.

International Search Report and Written Opinion for International Patent Application No. PCT/SE2015/050051, dated Sep. 28, 2015, 11 pages.

\* cited by examiner

MONITORING OPTICAL FIBRE LINK

This application is a 35 U.S.C. § 371 national phase filing of International Application No. PCT/SE2015/050051, filed Jan. 21, 2015, the disclosure of which is incorporated herein by reference in its entirety.

TECHNICAL FIELD

The invention relates to a device and a method performed by the device of monitoring an optical fibre link.

BACKGROUND

A growing demand for video/data transmitted the Internet and other networks increases need for higher speeds in transmission and delivery systems, especially at what is known as "the last mile", i.e. the last part of the transmission line reaching a user. Nowadays, telecommunications operators are deploying a large number of fibre links in order to deliver broadband access to the user based on Passive Optical Networks (PONs). With the increasing number of fibres and cables, the probability of fault at some point of the PON also increases, generating a demand for fibre inspection.

The need for optical fibre maintenance functions for prevention and fault maintenance has been extensively discussed, for instance by International Telecommunication Union's Telecommunication Standardization Sector Study Group 6 (ITU-T SG6). Most studies considered by the group were based on the use of traditional Optical Time Domain Reflectometry (OTDR) in order to localize faults with reasonable accuracy without in optical networks without interfering with data transmission.

It is desirable to implement an inspection solution that neither interferes with data transmission, nor requires high additional capital and operational expenses. Furthermore, the implementation of Subcarrier Multiplexed (SCM) signals in PONs enables the use of a subcarrier for fibre monitoring purposes, rather than monitoring faults over a separate optical carrier, which would require a separate transmission and detection scheme.

For instance, methods are known that employ a pulse monitoring scheme modulated into the SCM signal in similar fashion to an OTDR solution, without the need for additional transmission equipment. Aside from the need for pulse averaging in order to obtain sufficient resolution, this technique also requires additional filtering to separate the monitoring pulse from the subcarrier signal. Furthermore, the monitoring pulse and its harmonics may interfere with data transmission.

SUMMARY

An object of the present invention is to solve, or at least mitigate, this problem in the art and to provide an improved method and device for monitoring an optical fibre link.

This object is attained in a first aspect of the present invention by a method of monitoring an optical fibre link, comprising generating a monitoring signal used for monitoring the optical fibre link, combining the generated monitoring signal with a data signal to be transmitted over the optical fibre link, detecting backscattering of the monitoring signal from the optical fibre link, comparing the detected backscattered monitoring signal with an estimated monitoring signal backscattered along the optical fibre link, and determining, based on the comparison, at least one location along the optical fibre link where the monitoring signal is backscattered, and signal loss caused by the backscattering.

This object is attained in a second aspect of the present invention by a monitoring device configured to monitor an optical fibre link. The monitoring device comprises a signal generator configured to generate a monitoring signal to be combined with a data signal to be transmitted by an optical transmitter over the optical fibre link, an optical receiver configured to detect backscattering of the monitoring signal from the optical fibre link, and a processing unit configured to compare the detected backscattered monitoring signal with an estimated backscattered monitoring signal, and to determine, based on the comparison, at least one location along the optical fibre link where the monitoring signal is backscattered, and signal loss caused by the backscattering.

Thus, at an optical transmitter, a monitoring signal is generated and combined in a coupler with a "regular" data signal to be transmitted over the optical fibre link to be monitored. The combined signal modulates a light source for transmitting an optical signal over the optical fibre link via an optical circulator. The combined signal enters a first port of the circulator and exits into the optical fibre link via a second port. In case of a fault or a break in the optical fibre link, the combined signal will be attenuated after the fault or break point towards the user. The fraction of the combined signal which is backscattered along the link will also be attenuated or modified after the fault or break point. It should be noted that backscattering always is present in an optical fibre link, but the backscattering of a signal transmitted over the link will change at a fault or break point as compared to backscattering of signal in a link having no fault or break points. The backscattered signal will thus be received at the second port of the circulator and output at a third port of the circulator. The backscattered monitoring signal is thus detected at the third port of the circulator and compared with an estimated representation of the backscattered monitoring signal, for instance by employing a best fit approach of the detected backscattered monitoring signal with the estimated representation of the backscattered monitoring signal, such that one or more locations of the fibre link at which the backscattered monitoring signal is modified can be determined as well as optical loss of the signal at the location(s). Hence, when determining the location at which the backscattered monitoring signal is modified (where a change in signal characteristics occurs, such as a decrease in intensity) by comparing the detected backscattered monitoring signal with the estimated backscattered monitoring signal, the fault or break point can be located.

In this manner, a fibre monitoring scheme for fault location and loss measurement is advantageously provided in optical fibre links (as used in e.g. PONs and hybrid copper-fibre PONs) employing the equipment used for data transmission whilst typically reserving the baseband for the monitoring of faults.

Thus, a method is presented to locate and measure faults in an optical fibre based on low frequency modulation of the optical power launched in the fibre and measuring the phase and amplitude of the modulated backscattered optical power by adding a monitoring device to the equipment used for data transmission, granting low additional cost. The method uses either the baseband or a subcarrier of an SCM-PON and can be equally used in a PON utilizing Time-Division Multiplexing (TDM) or Wavelength-Division Multiplexing (WDM).

The monitoring signal is typically, but not necessarily, generated in baseband to avoid any interference with the data signal. Further, intensity of the backscattered signal is greater at low frequencies, which allows for a low-intensity monitoring signal to be used at baseband.

Advantageously, the detection of fault location and intensity in an optical fiber link can be done efficiently without the need for additional transmission equipment; only the monitoring device according to embodiments of the present invention is interfaced with an existing optical transmitter. Further advantageous is that pulse averaging or additional filtering of detected signal is avoided, and a simple and straightforward modulation scheme can be used for the monitoring signal.

Preferred embodiments of the present invention will be set forth in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
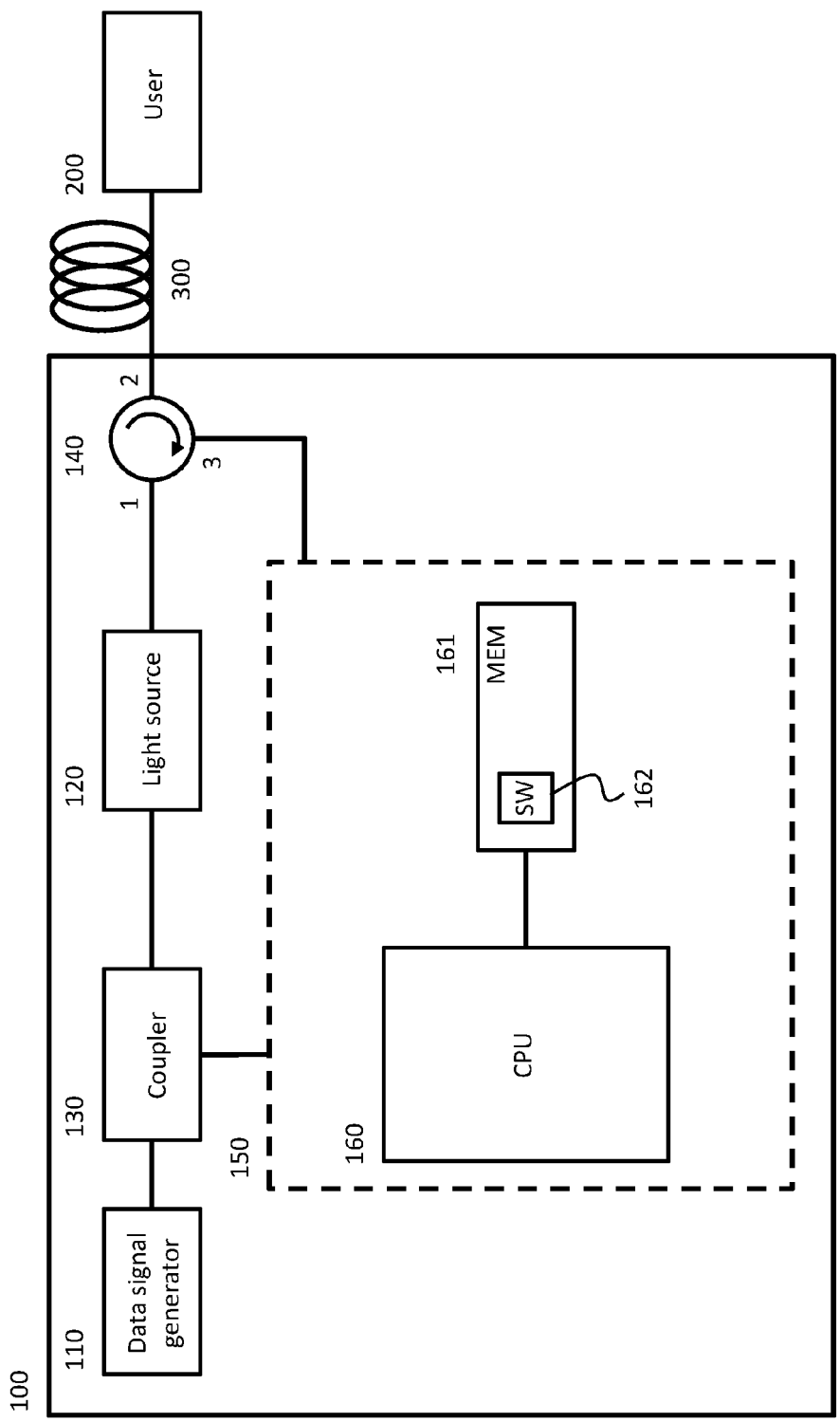
FIG. 1 illustrates an optical transmitter in which a monitoring device according to an embodiment of the present invention is implemented.

FIG. 1 illustrates an optical transmitter 100 in which a monitoring device 150 according to an embodiment of the present invention is implemented for advantageously detecting fault loss intensity and location during ongoing communication. The optical transmitter 100 transmits an optical data signal to a user 200 via an optical fibre link 300.

The optical transmitter 100 comprises a data signal generator no used for generating regular communication data signals (for one or multiple users). The generator is connected to a light source 120 for generating optical data signals transmitted to the user 200 via the optical fibre link 300. Further, in order to connect the monitoring device 150 to the communication path of the optical transmitter 100, a coupler 130 is utilized as well as a circulator 140.

In practice, parts or all of the steps of the method at the monitoring device 150 of monitoring the optical fiber link 300 is performed by a processing unit 160 embodied in the form of one or more microprocessors arranged to execute a computer program 162 downloaded to a suitable storage medium 161 associated with the microprocessor, such as a Random Access Memory (RAM), a Flash memory or a hard disk drive. The processing unit 160 is arranged to carry out the method according to embodiments of the present invention when the appropriate computer program 162 comprising computer-executable instructions is downloaded to the storage medium 161 and executed by the processing unit 160, possibly by interfacing with other elements of the monitoring device 150, such as a photodetector for enabling optical reception. The storage medium 161 may also be a computer program product comprising the computer program 162. Alternatively, the computer program 162 may be transferred to the storage medium 161 by means of a suitable computer program product, such as a Digital Versatile Disc (DVD) or a memory stick. As a further alternative, the computer program 162 may be downloaded to the storage medium 161 over a network. The processing unit 160 may alternatively be embodied in the form of a digital signal processor (DSP), an application specific integrated circuit (ASIC), a field-programmable gate array (FPGA), a complex programmable logic device (CPLD), etc.

Figure 2:
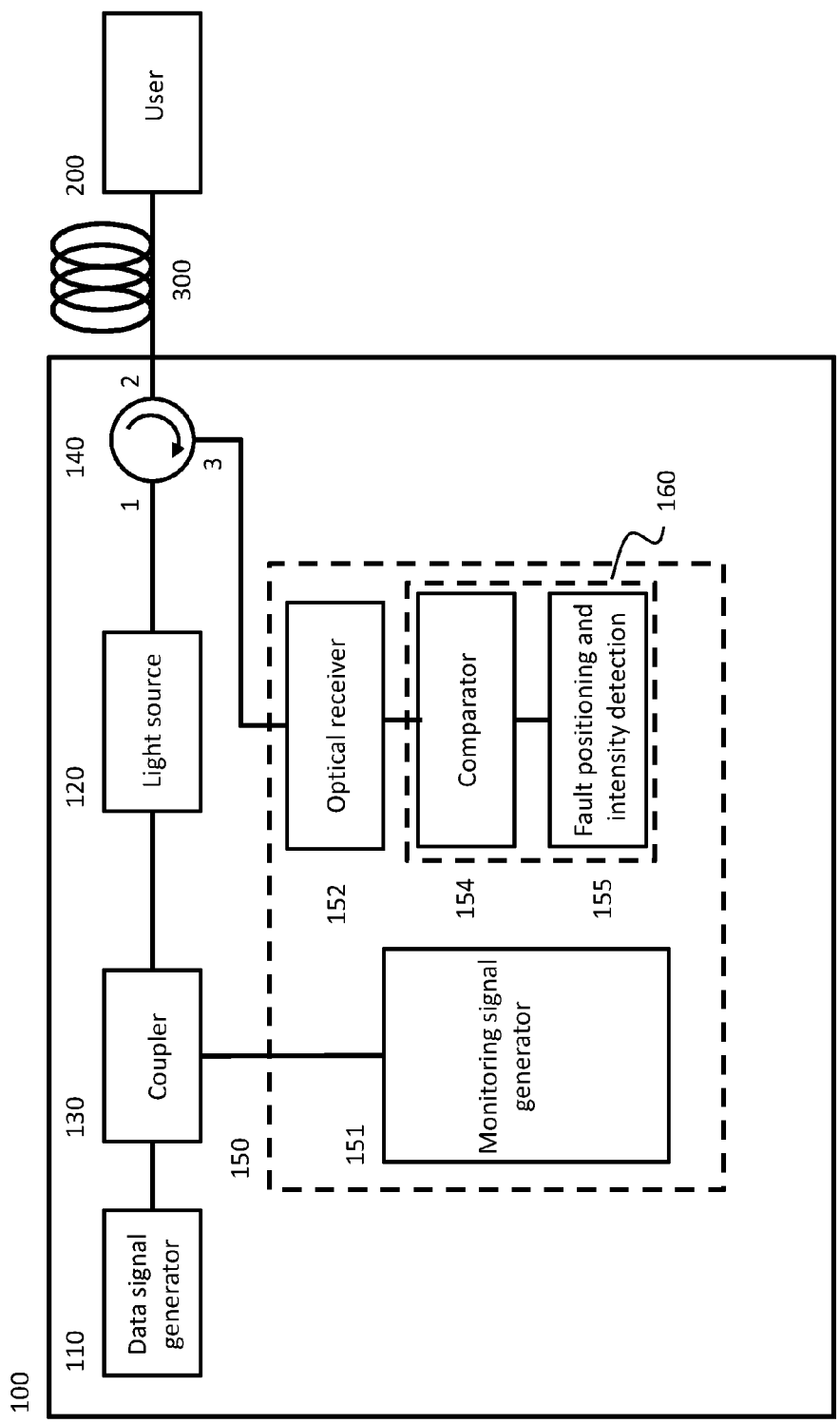
FIG. 2 illustrates the optical transmitter in which a monitoring device according to another embodiment of the present invention is implemented.
Figure 3:
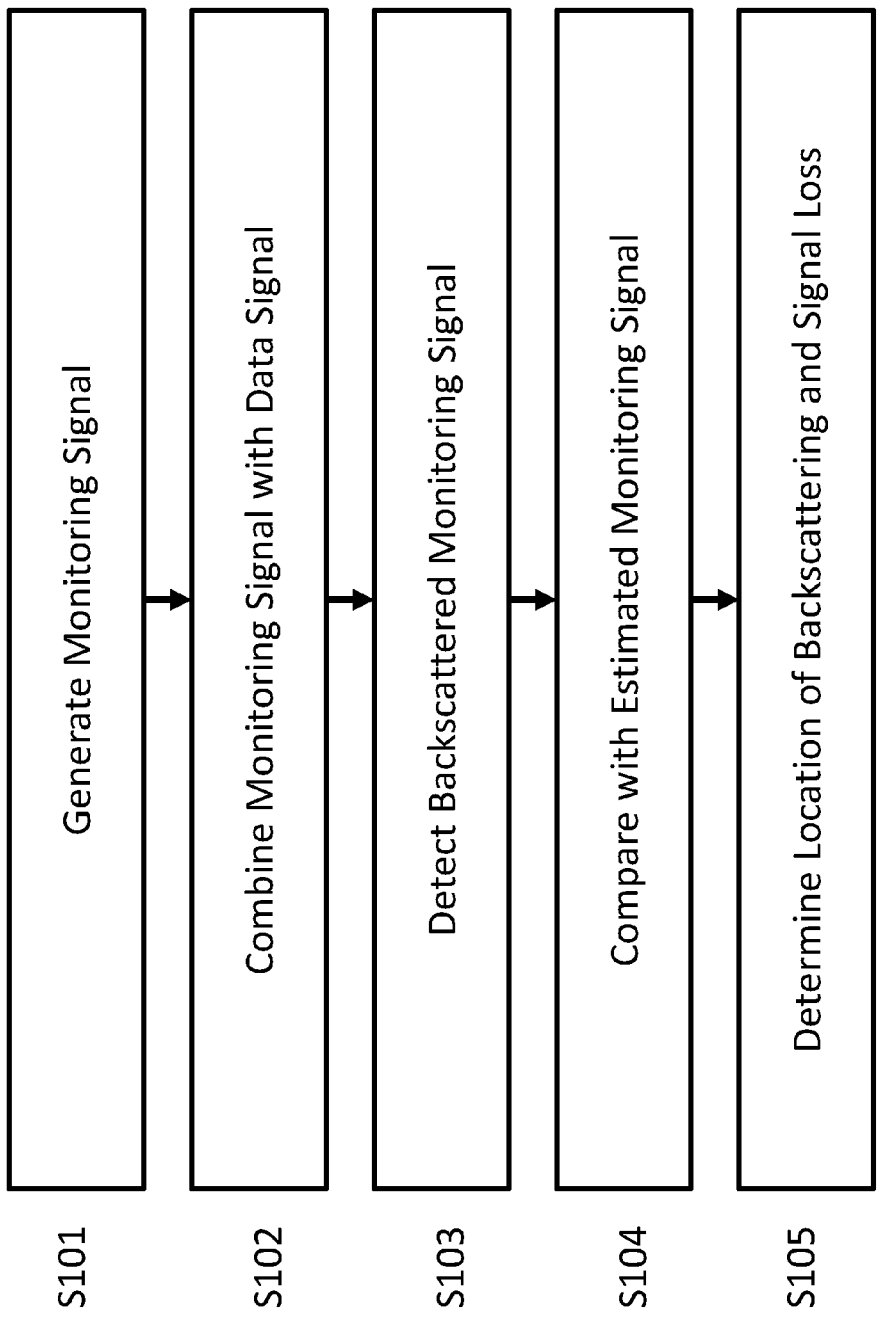
FIG. 3 illustrates a flowchart of an embodiment of a method according to the present invention as carried out by the monitoring device of FIG. 2.

FIG. 2 illustrates the optical transmitter 100 in which a monitoring device 150 according to another embodiment of the present invention is implemented. The monitoring device 150 will be described in the following with further reference to FIG. 3 illustrating flowchart of an embodiment of a corresponding method according to the present invention as carried out by the monitoring device 150 of FIG. 2.

A generator 151 of the monitoring device 150 generates in step S101 a monitoring signal, which is combined with the data signal of the data signal generator 110 in the coupler 130 in step S102. The monitoring signal is typically located in baseband to avoid any interference with the data signal.

The optical transmitter 100 further comprises an optical circulator 140 via which the combined signal enters port 1 and exits port 2 into the optical fibre link 300. In case of a fault or a break in the optical fibre link 300, the backscattered combined signal will be modified along the link 300 towards port 2 of the circulator 140 and enter the monitoring device 150 via port 3 of the circulator 140. Thus, the monitoring device 150 according to embodiments of the present invention is advantageously implemented in an existing optical communication setup by using the coupler 130 and the circulator 140 as interface elements.

The backscattered monitoring signal entering the monitoring device 150 via port 3 of the circulator 140 is detected in step S103 by an optical receiver 152 and supplied to the microprocessor 160 functionally illustrated by a comparator 154 configured to compare the detected backscattered monitoring signal in step S104 with an estimated representation of the backscattered monitoring signal, for instance by employing a best fit approach of the detected backscattered monitoring signal with the estimated representation of the backscattered monitoring signal, such that a location of the fibre link 300 at which the monitoring signal backscatters due to e.g. a fault or break point can be determined as well as optical loss of the signal at the location of backscattering by block 155 of the microprocessor 160 in step S105.

Figure 4:
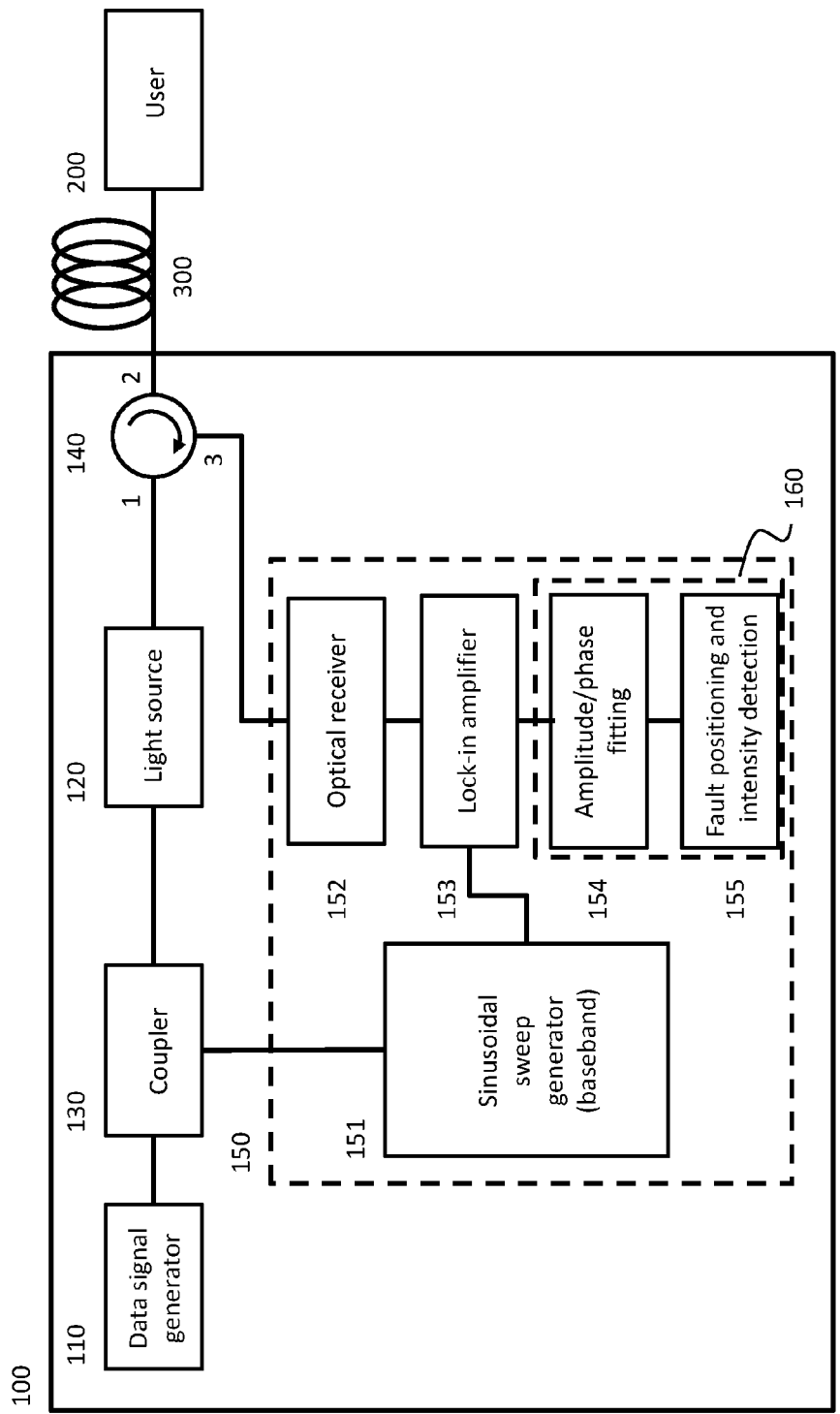
FIG. 4 illustrates a further embodiment of the monitoring device according to the present invention.

FIG. 4 illustrates a further embodiment of the monitoring device according to the present invention. The monitoring signal is generated by the sinusoidal sweep generator 151 (e.g. at baseband) and combined with the data signal in the coupler 130. The combined signal causes the light source 120 to send optical signals via port 1 and port 2 of the circulator 140 across the optical fibre link 300 to the user 200. Any reflections of the signal transmitted across the link 300 will backscatter and enter the circulator 140 via port 2 and exit via port 3. The backscattered signal thus enters the monitoring device 150 via port 3 of the circulator 140 and is detected by the optical receiver 152. The monitoring device 150 of this embodiment further comprises a lock-in amplifier 153 using the monitoring signal generated by the generator 151 as a reference to acquire the detected backscattered signal amplitude and relative phase (from the combined signal reflected in the fibre link). The signal acquired is proportional to the output current of the optical receiver 152, which in turn is proportional to the intensity of the backscattered light. The lock-in amplifier 153 is followed by a microprocessor 160 which fits 154 the acquired amplitude and phase of the detected backscattered monitoring signal to an amplitude and phase of an estimated backscattered monitoring signal and further determines the location of the backscattering and signal loss is determined by a best fit approach performed by the fault positioning and intensity detection block 155.

The proposed invention employs the existing transmission scheme used for data transmission in the SCM-PON, where the baseband is reserved for monitoring of the optical fibre link 300. The power of the light source 120 of the optical transmitter 100 is sinusoidally modulated at angular frequency $\Omega$ as $P=P_o[1+m\cos(\Omega t)]$, where m is the modulation depth. The optical power backscattered along the fibre link 300 and/or reflected at discrete points, such as connectors or mendings, will then be modulated at the same frequency.

The backscattered signal from the fibre link 300 for the subcarrier embodied by the generated monitoring signal re-enters the optical transmitter 100 at port 2 of the circulator 140 followed by the optical receiver 152, for instance being a photodetector, which detects the signal intensity of the backscattered combined signal. The monitoring signal amplitude and phase of the backscattered combined signal is then detected by the lock-in amplifier 153 acting as a vector voltmeter as the frequency $\Omega$ is swept over a range of frequencies of the generated monitoring signal.

The detected backscattered signal S from the monitored fibre link 300 is given by the sum of reflections that may occur, for example at the end of the fibre link 300, and Rayleigh Backscattered Signal (RBS) along the fibre link 300. An LMS algorithm is implemented to fit the recorded phase/amplitude data to an estimated (and thus expected) function of the varying frequency. Considering that a previous state (existing mends and reflections, length, attenuation, refractive index, etc.) of the fibre link 300 is known, a new fault occurrence, its position and corresponding loss intensity are readily detected by the algorithm, which fits the estimated, i.e. theoretical, phase/amplitude signal representation to the measured one.

In a simplest case where a single reflection with reflectivity R occurs at the end of the fibre link 300 and a single fault occurs at a distance d from the beginning of the fibre link 300 with corresponding loss $\delta$, the detected signal intensity S from the monitored fibre link 300 (considering m=1) is given by:

$$S = \delta^2 R P_0 e^{j(2Kz-\Omega t)} + \int_0^d C P_0 e^{j(2Kz-\Omega t)} dz + \delta^2 \int_d^L C P_0 e^{j(2Kz-\Omega t)} dz \quad (1)$$

The factor C represents the RBS coefficient. The fault loss intensity (i.e. signal loss at the location of backscattering) is squared because the light passes twice along the lossy point in its round trip from the optical transmitter 100 to the location of fibre link backscattering and back again. The fibre attenuation is modelled within the complex coefficient K, which is composed of the modulation wavevector as its real part and the attenuation factor as its imaginary part.

Equation (1) may be rewritten as:

$$S = \delta^2 R P_0 e^{j(2Kz-\Omega t)} + (1-\delta^2) \int_0^d C P_0 e^{j(2Kz-\Omega t)} dz + \delta^2 \int_d^L C P_0 e^{j(2Kz-\Omega t)} dz \quad (2)$$

Direct integration provides the equation for the intensity that is employed in the LMS algorithm to determine the location of the backscattering and loss intensity.

$$S = \delta^2 R P_0 e^{j(2Kz-\Omega t)} \delta^2 C P_0 L \frac{\mathrm{Sin}(KL)}{KL} e^{j(KL-\Omega t)} (1 - \delta^2) C P_0 d \frac{\mathrm{Sin}(Kd)}{Kd} e^{j(Kd-\Omega t)} \quad (3)$$

In the case considered, the resulting signal is the sum of three phasors relating to the reflection, the loss position and the total length of the fibre. This result may be extended for the case where there are more than one reflection/backscattering points or when more lossy events occur by considering additional phasor terms in the sum.

Disregarding the reflections, the case with a single fault in equations (1-3) is described by:

$$S = \delta^2 C P_0 L \frac{\mathrm{Sin}(KL)}{KL} e^{j(KL-\Omega t)} + (1-\delta^2) C P_0 d \frac{\mathrm{Sin}(Kd)}{Kd} e^{j(Kd-\Omega t)} \quad (4)$$

Considering the case of two faults with loss intensity $\delta_1$ and $\delta_2$ at positions $d_1$ and $d_2$, respectively, equation (4) may be extended such that the detected signal is now derived as follows:

$$S = \int_0^{d_1} C P_0 e^{j(2Kz-\Omega t)} dz + \quad (5)$$

$$\delta_1^2 \int_{d_1}^{d_2} C P_0 e^{j(2Kz-\Omega t)} dz + \delta_1^2 \delta_2^2 \int_{d_2}^{L} C P_0 e^{j(2Kz-\Omega t)} dz =$$

$$\delta_1^2 \delta_2^2 \int_0^L C P_0 e^{j(2Kz-\Omega t)} dz + (1-\delta_1^2) \int_0^{d_1} C P_0 e^{j(2Kz-\Omega t)} dz +$$

$$\delta_1^2 (1-\delta_2^2) \int_0^{d_2} C P_0 e^{j(2Kz-\Omega t)} dz =$$

$$\delta_1^2 \delta_2^2 C P_0 L \frac{\mathrm{Sin}(KL)}{KL} e^{j(KL-\Omega t)} + (1-\delta_1^2) C P_0 d_1 \frac{\mathrm{Sin}(Kd_1)}{Kd_1} e^{j(Kd_1-\Omega t)} +$$

$$\delta_1^2 (1-\delta_2^2) C P_0 d_2 \frac{\mathrm{Sin}(Kd_2)}{Kd_2} e^{j(Kd_2-\Omega t)}$$

Similarly, for the case of three faults with loss intensity $\delta_1$, $\delta_2$ and $\delta_3$ at positions $d_1$, $d_2$ and $d_3$, respectively, the detected signal is given by:

$$S = \int_0^{d_1} CP_0 e^{j(2Kz-\Omega t)} dz + \delta_1^2 \int_{d_1}^{d_2} CP_0 e^{j(2Kz-\Omega t)} dz + \quad (6)$$

$$\delta_1^2 \delta_2^2 \int_{d_2}^{d_3} CP_0 e^{j(2Kz-\Omega t)} dz + \delta_1^2 \delta_2^2 \delta_3^2 \int_{d_3}^{L} CP_0 e^{j(2Kz-\Omega t)} dz =$$

$$\delta_1^2 \delta_2^2 \delta_3^2 \int_0^{L} CP_0 e^{j(2Kz-\Omega t)} dz + (1-\delta_1^2) \int_0^{d_1} CP_0 e^{j(2Kz-\Omega t)} dz +$$

$$\delta_1^2(1-\delta_2^2) \int_0^{d_2} CP_0 e^{j(2Kz-\Omega t)} dz +$$

$$\delta_1^2 \delta_2^2 (1-\delta_3^2) \int_0^{d_3} CP_0 e^{j(2Kz-\Omega t)} dz =$$

$$\delta_1^2 \delta_2^2 \delta_3^2 CP_0 L \frac{\text{Sin}(KL)}{KL} e^{j(KL-\Omega t)} +$$

$$(1-\delta_1^2) CP_0 d_1 \frac{\text{Sin}(Kd_1)}{Kd_1} e^{j(Kd_1-\Omega t)} +$$

$$\delta_1^2(1-\delta_2^2) CP_0 d_2 \frac{\text{Sin}(Kd_2)}{Kd_2} e^{j(Kd_2-\Omega t)} +$$

$$\delta_1^2 \delta_2^2 (1-\delta_3^2) CP_0 d_3 \frac{\text{Sin}(Kd_3)}{Kd_3} e^{j(Kd_3-\Omega t)}$$

The previous deduction may be extended to the case of multiple faults. Let the fault loss intensities be $\delta_1, \delta_2, \ldots, \delta_N$, with corresponding locations $d_1, d_2, \ldots, d_N$, such that $o<d_1<d_2<\ldots<d_N<L$. Considering $\delta_o=1$ and $\delta_{N+1}=O$, to represent the loss factors at the beginning ($d_o=O$) and at the end ($d_{N+1}=L$) of the fibre link, an equation (7) that describes the detected signal is derived to be:

$$S = \sum_{n=1}^{N+1} \left[\sum_{i=0}^{n-1} \delta_i^2\right] (1-\delta_n^2) \int_0^{d_n} CP_0 e^{j(2Kz-\Omega t)} dz =$$

$$\sum_{n=1}^{N+1} \left[\sum_{i=0}^{n-1} \delta_i^2\right] (1-\delta_n^2) CP_0 d_n \frac{\sin(Kd_n)}{Kd_n} e^{j(Kd_n-\Omega t)}$$

For the case where many loss events are already present in the fibre link due to the as-built condition, such as those corresponding to splices and/or connectors, the loss and position of all the events will be included in the equation and the algorithm fits the value and position of any new loss.

Figure 5:
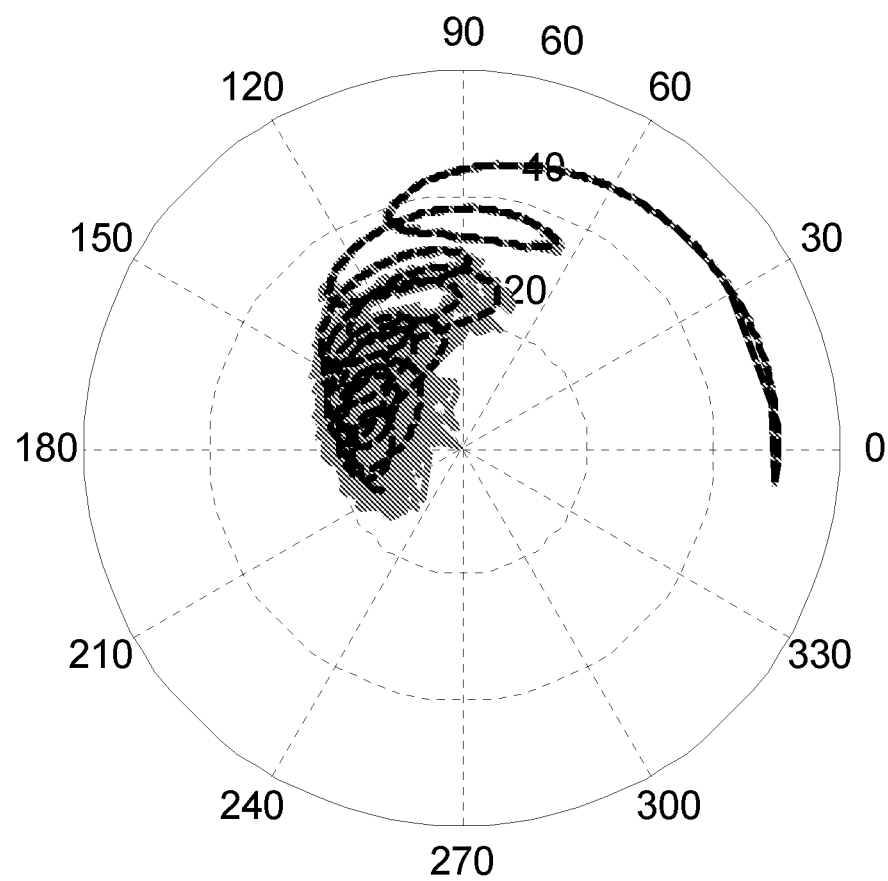
FIG. 5 illustrates a first measured phase/amplitude polar plot and a first theoretical plot best fit.

FIG. 5 illustrates a measured phase/amplitude polar plot for a 12 km optical fibre link with a 0.5 dB loss event at 4 km and theoretical plot best fit, which found a 0.5 dB loss at 3.996 km.

Figure 6:
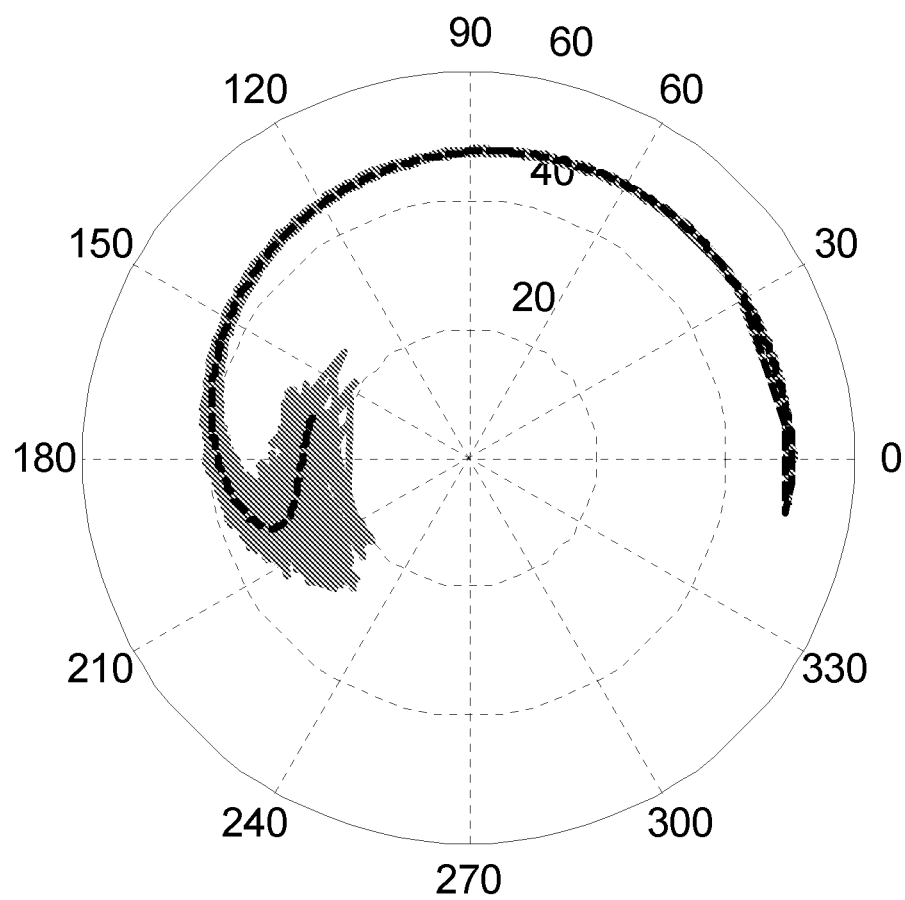
FIG. 6 illustrates a second measured phase/amplitude polar plot and a second theoretical plot best fit.

FIG. 6 illustrates a measured phase/amplitude polar plot for a 1 km optical fibre link with a 0.5 dB loss event at 0.350 km and theoretical plot best fit, which found a 0.5 dB loss at 0.351 km.

Figure 7:
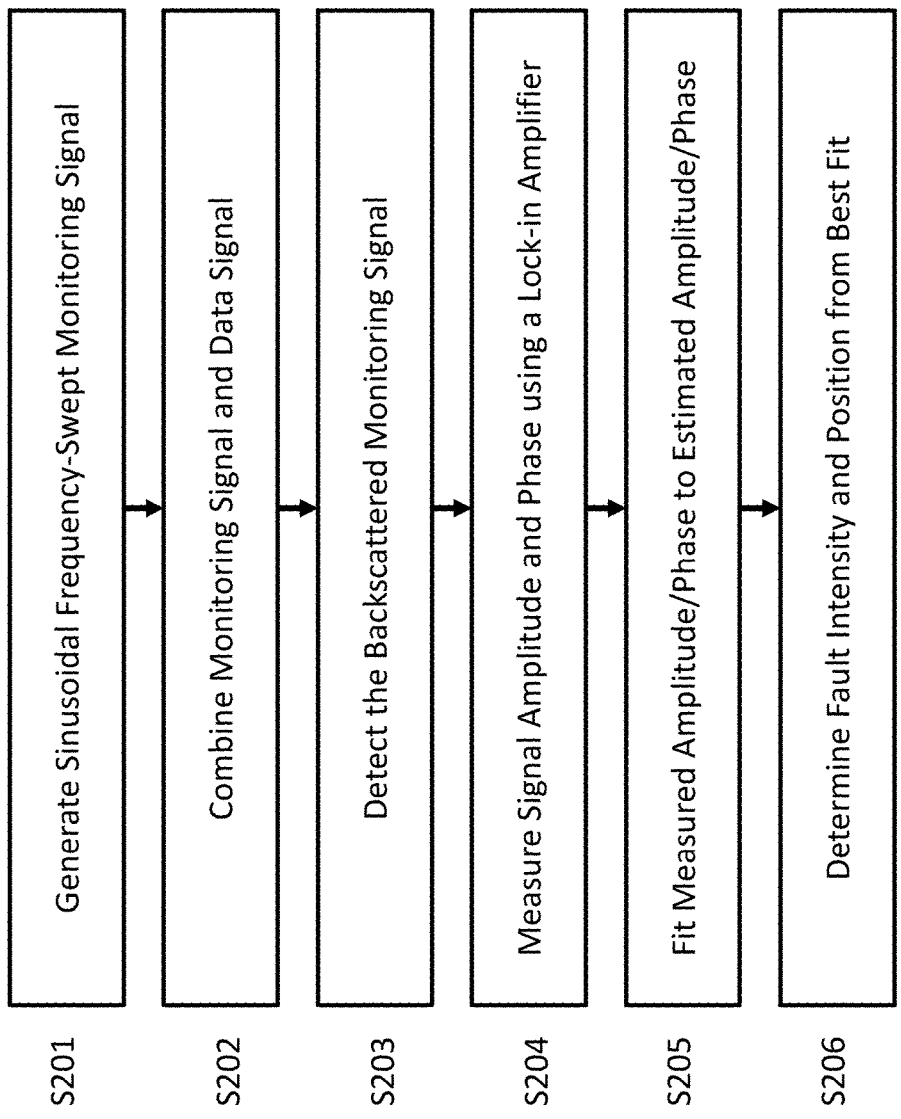
FIG. 7 illustrates a flowchart of a method of monitoring an optical fibre link according to a further embodiment of the present invention using polar plot best fit.

FIG. 7 illustrates a flowchart of a method of monitoring an optical fibre link according to a further embodiment of the present invention using a best fit, which can be illustrated with a graphical illustration, for instance a polar plot. Reference is further made to FIG. 4 for structural elements. The generator 151 of the monitoring device 150 performs a sinusoidal frequency sweep (e.g. at baseband) to generate the monitoring signal in step S201. The generated monitoring signal is combined with the data signal in the coupler 130 in step S202. The combined signal causes the light source 120 to send optical signals via port 1 and port 2 of the circulator 140 across the optical fibre link 300 to the user 200. Any reflections of the signal transmitted across the fibre link 300 will backscatter and enter the circulator 140 via port 2 and exit via port 3. The backscattered signal thus enters the monitoring device 150 via port 3 of the circulator 140 and is detected by the optical receiver 152 in step S203. The monitoring device 150 of this embodiment further comprises a lock-in amplifier 153 using the frequency-swept monitoring signal generated by the generator 151 as a reference to acquire the detected backscattered signal amplitude and relative phase (from the combined signal reflected in the fibre link) in step S204. The signal acquired is proportional to the output current of the optical receiver 152, which in turn is proportional to the intensity of the backscattered light. The lock-in amplifier 153 is followed by a microprocessor 160 that fits, in step S205 by block 154, the acquired phase and amplitude of the measured backscattered monitoring signal as illustrated in FIGS. 5 and 6 and compares the measured phase and amplitude with an estimated (i.e. theoretical) phase and amplitude of a backscattered monitoring signal by performing a best fit approach, the best fit resulting in a detected location of the backscattering as well as signal loss caused by the backscattering.

Advantageously, the fitting of the measured amplitude and phase with the estimated amplitude and phase is performed using an LMS algorithm. Thus, block 154 uses the LMS algorithm to fit the measured backscattered monitoring signal and the estimated backscattered monitoring signal using the position and loss of a new fault as fitting variables (as extensively has been described throughout equations 1-7), wherein the fault position and intensity detection block 155 selects a best fit in step S206. It should be noted that the use of the LMS algorithm is an example embodiment and the any appropriate fitting algorithm using any appropriate fitting criterion can be envisaged, such as for instance an absolute value mean deviation, fourth power mean deviation or any weighted mean deviation method, etc.

It should further be noted that when sweeping the frequency of the monitoring signal and measuring the backscattered signal amplitude and phase, it is in fact that the backscattering transfer function that is measured. Hence, any appropriate method of performing this measurement is applicable. As an example, the backscattered transfer function could be measured by launching an impulse monitoring signal (containing all desired frequencies) and measure the response. The amplitude/phase at each frequency would analogously be obtained by mathematical processing of the received signal.

Figure 8:
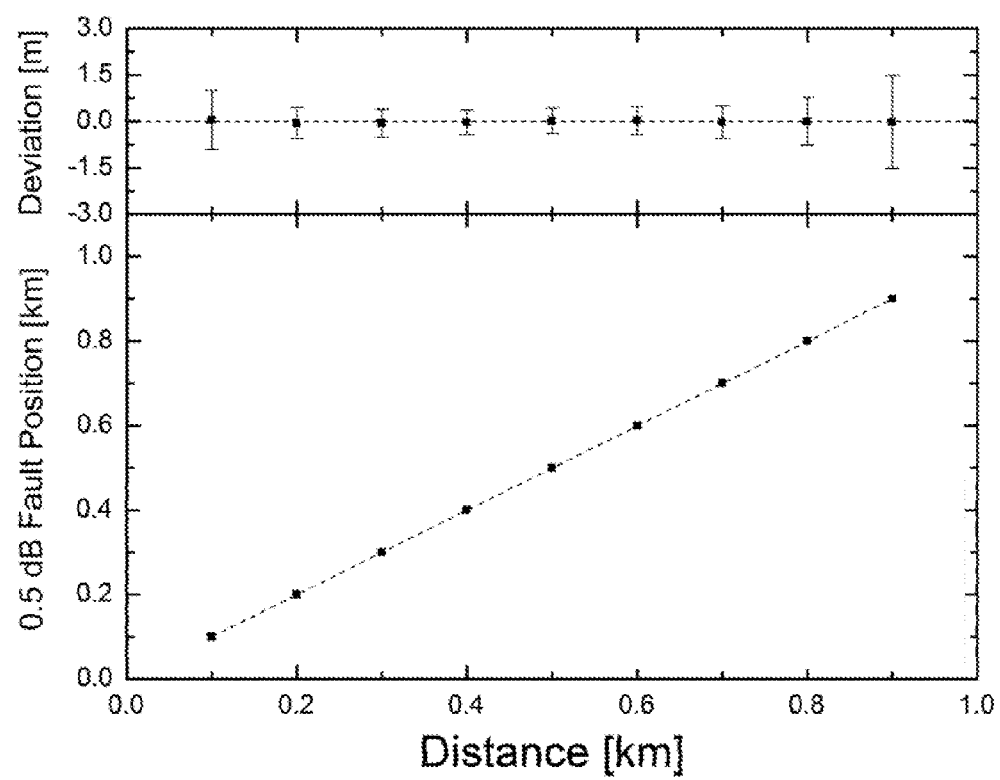
FIG. 8 illustrates sensitivity and accuracy of the method of monitoring an optical fibre link according to the present invention, presenting the standard deviation of the detected fault location as function of its position.
Figure 9:
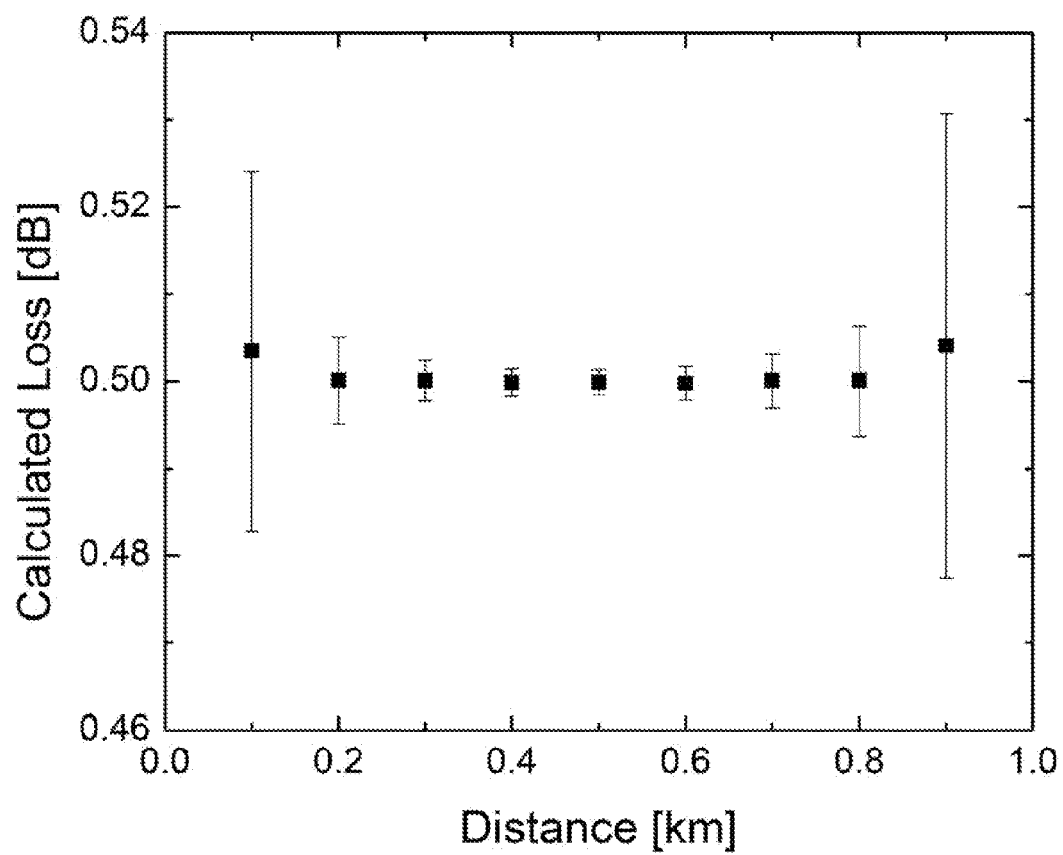
FIG. 9 illustrates sensitivity and accuracy of the method of monitoring an optical fibre link according to the present invention, presenting the standard deviation of the detected fault intensity in dB.

FIGS. 8 and 9 illustrate sensitivity and accuracy of the method of monitoring an optical fibre link according to the present invention, showing 200 simulated measured polar plots for a 0.5 dB loss fault with a random amplitude/phase noise added to the signal and found the corresponding best-fit data for each fault location in a 1-km fibre link. FIG. 8 presents the standard deviation of the detected fault location as function of its position, whereas FIG. 9 presents the standard deviation of the detected fault intensity in dB. The accuracy of the method is better than 3 m and 0.02 dB depending on the fault position.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of monitoring an optical fibre link, comprising:
generating a monitoring signal used for monitoring the optical fibre link;
combining the generated monitoring signal with a data signal to be transmitted over the optical fibre link;
detecting backscattering of the monitoring signal from the optical fibre link;
comparing the detected backscattered monitoring signal with an estimated backscattered monitoring signal; and
determining, based on the comparison, at least one location along the optical fibre link where the monitoring signal is backscattered, and signal loss caused by the backscattering.

2. The method of claim 1, wherein the generating of the monitoring signal comprises:
performing a sinusoidal frequency sweep to generate the monitoring signal; and
performing lock-in amplification of the backscattered combined signal with the sinusoidal frequency-swept monitoring signal as a reference, wherein amplitude and phase of the backscattered monitoring signal is detected.

3. The method of claim 2, wherein the comparing of the detected backscattered monitoring signal with an estimated backscattered monitoring signal comprises:
fitting the amplitude and phase of the detected backscattered monitoring signal to an amplitude and phase of an estimated backscattered monitoring signal; and
determining said at least one location of the backscattering and signal loss from a best fit.

4. The method of claim 1, wherein the determining of said at least one location comprises:
determining, based on the comparison of the detected backscattered monitoring signal with the estimated backscattered monitoring signal, said at least one location along the optical fibre link where the backscattered monitoring signal is modified, wherein the location of at least one fault of the optical fibre link and signal loss caused by the at least one fault is detected.

5. The method of claim 3, wherein the at least one location along the optical fibre link where the monitoring signal is backscattered, and signal loss caused by the backscattering, is determined using Least Mean Square, LMS, fitting.

6. The method of claim 1, further comprising:
generating a data signal to be transmitted over the optical fibre link;
generating an optical signal over the fibre link based on the combined data signal and monitoring signal; and
supplying the generated optical signal to a first port of a circulator for transmission of the generated optical signal over the optical fibre link via a second port of the circulator, and receiving the backscattered monitoring signal via a second port of the circulator and supplying the backscattered monitoring signal to the monitoring device via a third port of the circulator.

7. A monitoring device configured to monitor an optical fibre link, comprising:
a signal generator configured to generate a monitoring signal to be combined with a data signal to be transmitted by an optical transmitter over the optical fibre link;
an optical receiver configured to detect backscattering of the monitoring signal from the optical fibre link; and
a processing unit configured to compare the detected backscattered monitoring signal with an estimated backscattered monitoring signal, and to determine, based on the comparison, at least one location along the optical fibre link where the monitoring signal is backscattered, and signal loss caused by the backscattering.

8. The monitoring device of claim 7, the signal generator further being configured to perform a sinusoidal frequency sweep to generate the monitoring signal; the monitoring device further comprising:
a lock-in amplifier configured to perform lock-in amplification of the backscattered combined signal with the sinusoidal frequency-swept monitoring signal as a reference, wherein amplitude and phase of the backscattered monitoring signal is detected.

9. The monitoring device of claim 8, the processing unit being configured to, when comparing the detected backscattered monitoring signal with an estimated backscattered monitoring signal:
fit the amplitude and phase of the detected backscattered monitoring signal to an amplitude and phase of an estimated backscattered monitoring signal, wherein the at least one location of the backscattering and signal loss is determined by a best fit.

10. The monitoring device of claim 7, the processing unit being configured to, when determining the at least one location:
determine, based on the comparison of the detected backscattered monitoring signal with the estimated backscattered monitoring signal, at least one location along the optical fibre link where the backscattered monitoring signal is modified, wherein the location of at least one fault of the optical fibre link and signal loss caused by the at least one fault is detected.

11. The monitoring device of claim 9, the processing unit being configured to determine the at least one location along the optical fibre link where the monitoring signal is backscattered, and signal loss caused by the backscattering, using Least Mean Square, LMS, fitting.

* * * * *